Patented Apr. 19, 1949

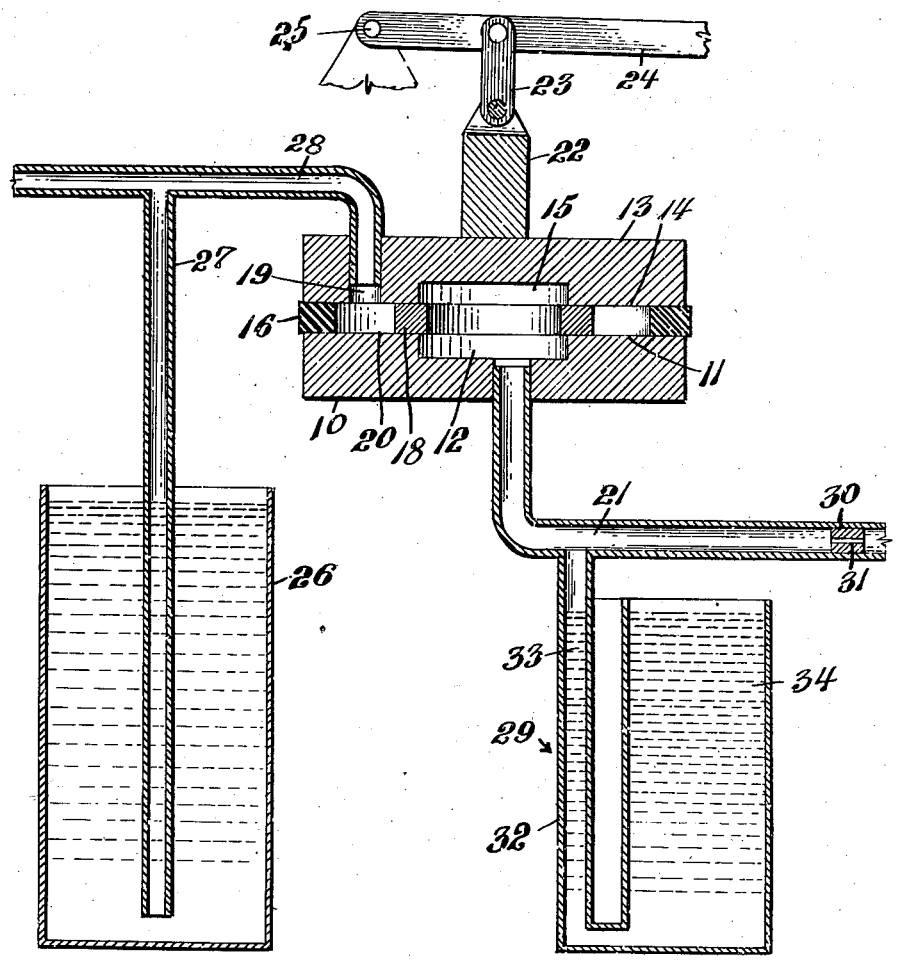

2,467,552

UNITED STATES PATENT OFFICE 2,467,552

LEAKAGE TESTING GAUGE

Walter Graves, Ann Arbor, Mich., assignor, by mesne assignments, to Federal Products Corporation, Providence, R. I., a corporation of Rhode Island Application April 20, 1945, Serial No. 589,417

5 Claims. (Cl. 73—47)

This invention relates to a gauge for testing the conformance of a test specimen with a standard, and particularly relates to a device adapted to operate by imposing a selected fluid pressure in excess of atmospheric upon the test specimen as said specimen is in contact with said standard and measuring the fluid leaking between the specimen and the standard.

It is well known that in the manufacture of a large number of items, such as rings, washers, pins and other similar small parts, there has in recent years been developing a continuously stricter demand for accuracy and precision. As a corollary to this, there has concurrently developed a need for rapidly and efficiently testing whether production parts conform to an approved standard within permissible limits. Fluid operated testing devices of this general type have been known for a long time and the specifications for many articles of the type mentioned are being given in terms of a specified fluid pressure, usually relatively high, at which the articles being tested will hold said fluid in cooperation with a standard seat against more than a specified maximum leakage. This makes a fast, accurate and realistic method of checking such articles and is, of course, adaptable to use with many other articles which must be made with contours difficult to measure by ordinary means but which, nevertheless, must be made with extreme accuracy.

While many devices have long been known for this general purpose, they fail to meet the present requirements in one or more ways. For example, in some of the suction types it is not possible to secure a pressure differential of more than one atmosphere and this is not sufficient to test many types of articles. In others of the pressure type, the pressure varies on the upstream side of the test specimen according to the amount of leakage occurring so that it is from difficult to impossible to impose a specified and constant pressure on a plurality of different specimens from a production line.

Accordingly, it is desirable to provide a testing method and device of the leak measuring type in which a definite and unknown pressure may be placed upon the test specimen, regardless of the amount of leakage past it, and which applied pressure will be constant for all items of a plurality of specimens of different leakage characteristics. It is also desirable to impose a pressure of several atmospheres on the test specimen and to be able to read the results quickly, easily and accurately. It is further desirable that a device for this purpose be easily and readily operable, and easily and accurately readable even by unskilled help.

Therefore, the principal object of my invention is to provide a contour and surface testing device of the leak measuring type which will impose an easily, accurately and automatically controlled pressure of more than one atmosphere upon the test specimen.

A further object of my invention is to provide a surface and contour measuring apparatus of the leak measuring type which can be easily, accurately and rapidly handled and read by unskilled help.

A further object of my invention is to provide a surface and contour testing device of the leak measuring type which is of simple manufacture and easy to maintain in accurate operating condition.

Further objects and purposes of my invention will be apparent to those acquainted with this type of apparatus upon the reading of the following specification and inspection of the accompanying drawing.

In the drawing:

The figure illustrates somewhat schematically and in central section a device for measuring an article, such as a washer, having flat and parallel surface.

In practicing the method and using the apparatus which comprise my invention, I first supply a fluid under an excess of pressure to a chamber and permit the escape of enough of said fluid to lower the pressure to the desired amount. The remaining fluid is then imposed upon the test specimen as it lies between testing standard blocks and the fluid permitted to leak between the mutually adjacent surfaces of the test specimen and the standard blocks. The amount of fluid so passing is then measured to indicate the degree of conformity by said specimen to said standard. Although various types of apparatus may be employed to carry out this method, so that the herewith disclosed apparatus is merely illustrative, it will nevertheless promote a clear explanation of my method to describe certain apparatus with which it may be used.

One form of specific apparatus of carrying out my improved method is illustrated in the drawing which shows an apparatus designed for measuring the accuracy of a member having a pair of parallel faces, such as a washer. There is provided a lower block body 10 having an accurately machined flat surface 11 and containing a central recess 12. There is also provided an upper block body 13 having a cooperating flat surface 14 and a central recess 15. The central recesses 12 and 15 cooperate with each other to provide a single central chamber when said block bodies are placed in operating position, as shown in the drawings, so that the faces 11 and 14 are adjacent and parallel to each other. When they are so placed they are by a gasket ring 16 sealed against the escape of operating fluid and suitably spaced in view of the particular thickness of washer 18 to be tested. A passageway 19 extends to the annular chamber 20, defined in one direction by the packing ring 16 and the test washer 18 and in the other direction by the faces 11 and 14 of said block bodies. A conduit 21 extends out from the recess 12 to suitable means for measuring the flow of working fluid therethrough. These body members are held together and/or moved apart for admitting and discharging test specimens by any suitable means which are more or less schematically shown in the figure. They comprise a member 22 extending above the block 13 to which a link member 23 is pivotally fastened at one end thereof and at the other end thereof to a handle 24 which is itself pivotally supported at 25 in any suitable manner.

In supplying the working fluid to this device under a constant pressure, any means of pressure regulation which functions effectively may be used. By way of specific example, there is provided a liquid containing tank 26 into which extends the diving tube 27 from the conduit 28 extending into the passageway 19. The working fluid, such as air, is supplied to said conduit 28 at a pressure slightly in excess of the desired working pressure. Since the depth of the liquid is adjusted to create at the bottom of the diving tube a pressure equal to the desired working pressure, an amount of said fluid representing said excess pressure will escape to the atmosphere through said diving tube. Since the level of the liquid in the tank 26 will remain constant, the pressure in the conduit 28 downstream from the point of communication therewith of the diving tube 27 will be under continuous and accurate regulation. This is true even though the amount of fluid passing through the system varies widely. It should be understood, however, that any of many other known means of pressure regulation may be used in place of the means here shown.

A suitable means for measuring the quantity of working fluid, such as air, escaping out through the conduit 21, is designated generally 29. There is an obstruction 30 placed in said conduit 21 and an orifice 31 of accurately controllable size provided within said obstruction. This orifice may in some cases be of fixed size and in other cases it will be desirable to make it adjustable, such as by an iris or a needle valve. Communicating with the conduit 21, upstream from said orifice, there is a manometer 32 comprising an indicating tube 33 connected with a supply tank 34. The top of said supply tank is open to the atmosphere so that as the pressure in the conduit 21 increases or decreases the surface of the liquid in the indicating tube 33 will rise and fall accordingly. However, it should be understood that any other convenient and accurate means for measuring the pressure within the conduit 21 may be used in place of the manometer here shown. Further, means of the flowmeter type for measuring directly the flow of fluid through the conduit 21 may be used in place of the pressure means above described.

In operation, this device and other devices employing the method of operation herein disclosed will be found to be fast and accurate. For the purpose of illustration, assuming that the washer 18 is desired to be made with parallel faces, the surfaces 11 and 14 of the body parts 10 and 13 are made parallel within the allowable gauge tolerance. Working fluid under a given pressure is introduced through the conduit 28 into the annular chamber 20 and escapes between both of the surfaces 11 and 13 and the washer 18 into the central chamber represented by the recesses 12 and 15. From here said working fluid passes out through the conduit 21 to measuring means 32. If the washer conforms closely to the gauge surfaces, the passage of working fluid will be small and the pressure in conduit 21 relatively low. If the washer does not conform properly to the gauging surfaces the passage of air will be relatively rapid and the pressure in the conduit 21 relatively high. The manometer will, of course, respond to pressure in the outlet conduit 21 to indicate the freedom with which working fluid is passing between said gauging surfaces and the subject surfaces of a particular test specimen. Permissible limits may be readily established by noting the position of the manometer column with a washer of maximum permissible irregularity after which other washers can be tested accurately and quickly merely by placing them in the position shown in the figure, closing the gauge parts together and noting the position of the manometer column. As test specimens are then placed in position, the manometer column will instantly and accurately show whether said specimens conform to the master seat to a degree placing them within or without the permissible tolerance and the pressure applied to the specimen will always be constant whether the leakage is great or little. Thus, accurate and careful testing of the washers can be carried out under closely controlled conditions rapidly and efficiently by unskilled labor, for the operator needs to observe only whether the liquid column in the manometer takes a position above or below an indicated limit and the pressure control is automatic.

It will be desirable for economy, though not essential to my invention, to correlate the opening and closing of the block 13 with a valve controlling the admission of working fluid. When the block 13 is closed, the valve should be operated, by hand or automatically, to admit working fluid into the chamber 20 and to shut off the supply of working fluid when said cap is opened.

Obviously, this principle may be applied to a wide variety of shapes to correspond to test specimens of a wide variety of forms. Likewise, various modifications of the equipment here illustrated can readily be made without altering the method herein contemplated and these variations will all be within the scope of my hereinafter appended claims except as said claims by their own terms expressly provide otherwise.

I claim:

1. In a device for testing a specimen having parallel sides, the combination: a body part having a recess; a second body part having a recess arranged with respect to the first-named body part so that said recesses cooperate with each other to provide a central chamber and the facing surfaces of said body parts surrounding said recesses being mutually parallel; a spacing and sealing member between said body parts at the periphery of the surfaces surrounding said recesses; a passageway connected to a source of working fluid under substantially constant pressure communicating to the space between said facing parallel surfaces inwardly of said sealing and spacing member, and another passageway providing communication from one of said recesses to flow measuring means.

2. In a device for testing the conformance of a test specimen with a standard specimen, the combination: a first body part having a surface with a recess; a second body part removably adjacent said first body part and having a surface with a recess arranged with respect to the recess in said first named body part so that said recesses cooperate with each other to provide a central chamber, and the surfaces of the body parts which surround said recesses facing each other and being shaped to fit closely against said standard specimen when same is interposed therebetween; a spacing and sealing member between said body parts at the periphery of the surfaces surrounding said recesses and spaced radially outward from the said specimen; a passageway connected to a source of working fluid under substantially constant pressure communicating to the space between said first and second body part members radially inwardly of said sealing and spacing member and radially outwardly of said specimen and another passageway providing communication from one of said recesses to flow measuring means.

3. In a device for checking the conformance of a test specimen with a standard specimen, the combination comprising: a first body part member having a recess; a second body part member removably arranged adjacent said first body part and having a recess arranged with respect to the recess in said first named body part member, so that said recesses cooperate with each other to provide a central chamber, facing surfaces of said body part members surrounding said recesses receiving and closing conforming to said test specimen; a spacing and sealing member between said body part members and spaced radially outwardly of a portion thereof occupied by said test specimen; a passageway connected to a source of working fluid and communicating to the space between said facing surfaces radially inwardly of said sealing and spacing member and radially outwardly of the portion of said surfaces contacted by said test specimen, and another passageway providing communication from one of said recesses to flow measuring means.

4. In a device for checking the conformance of a test specimen with a standard specimen, the combination comprising: a first body part having a recess; a second body part removably positioned adjacent said first body part and having a recess arranged with respect to the first named body part so that said recesses cooperate with each other to provide a central chamber, and at least a portion of the facing surfaces of said body parts surrounding said recesses being shaped to fit closely against said standard specimen; means spacing said body parts away from each other and sealing a zone therebetween including said chamber and extending radially outwardly therefrom; a passageway connected to a source of working fluid communicating with said zone inwardly of said spacing and sealing means and outwardly of the portion of said surfaces normally contacted by a test specimen; and another passageway providing communication from one of said recesses to flow measuring means.

5. In a device for testing the conformance of a test specimen with a standard specimen, the combination comprising: a first body part having a recess; a second body part member having a recess arranged with respect to the first named body part member so that said recesses normally communicate with each other to provide a central chamber, at least one of said body part members having a gauging surface substantially facing the other of said members and conforming to the surface of said test specimen; detachable means between said body part members sealing said body parts against the passage of fluid therebetween at points outwardly of the position occupied by a test specimen; a passageway connected to a source of working fluid communicating to the space between said body part members between said sealing means and the position occupied by the test specimen and another passageway providing communication from one of said recesses downstream of said gauging surface to flow measuring means.

WALTER GRAVES.

REFERENCES CITED

The following references are of record in the file of this patent:

UNITED STATES PATENTS

| Number | Name | Date |
|---|---|---|
| 1,027,834 | Fulmer | May 28, 1912 |
| 1,096,894 | Dodge | May 19, 1914 |
| 1,462,115 | Lauster | July 17, 1923 |
| 1,592,389 | Spill | July 13, 1926 |
| 1,764,616 | Fleming | June 17, 1930 |
| 1,883,522 | Breer | Oct. 18, 1932 |
| 1,901,966 | Hoffman et al. | Mar. 21, 1933 |
| 2,003,949 | Morgan et al. | June 4, 1935 |
| 2,026,187 | Mennesson | Dec. 31, 1935 |

FOREIGN PATENTS

| Number | Country | Date |
|---|---|---|
| 391,218 | Great Britain | Apr. 24, 1933 |